United States Patent Office 2,907,457
Patented Oct. 6, 1959

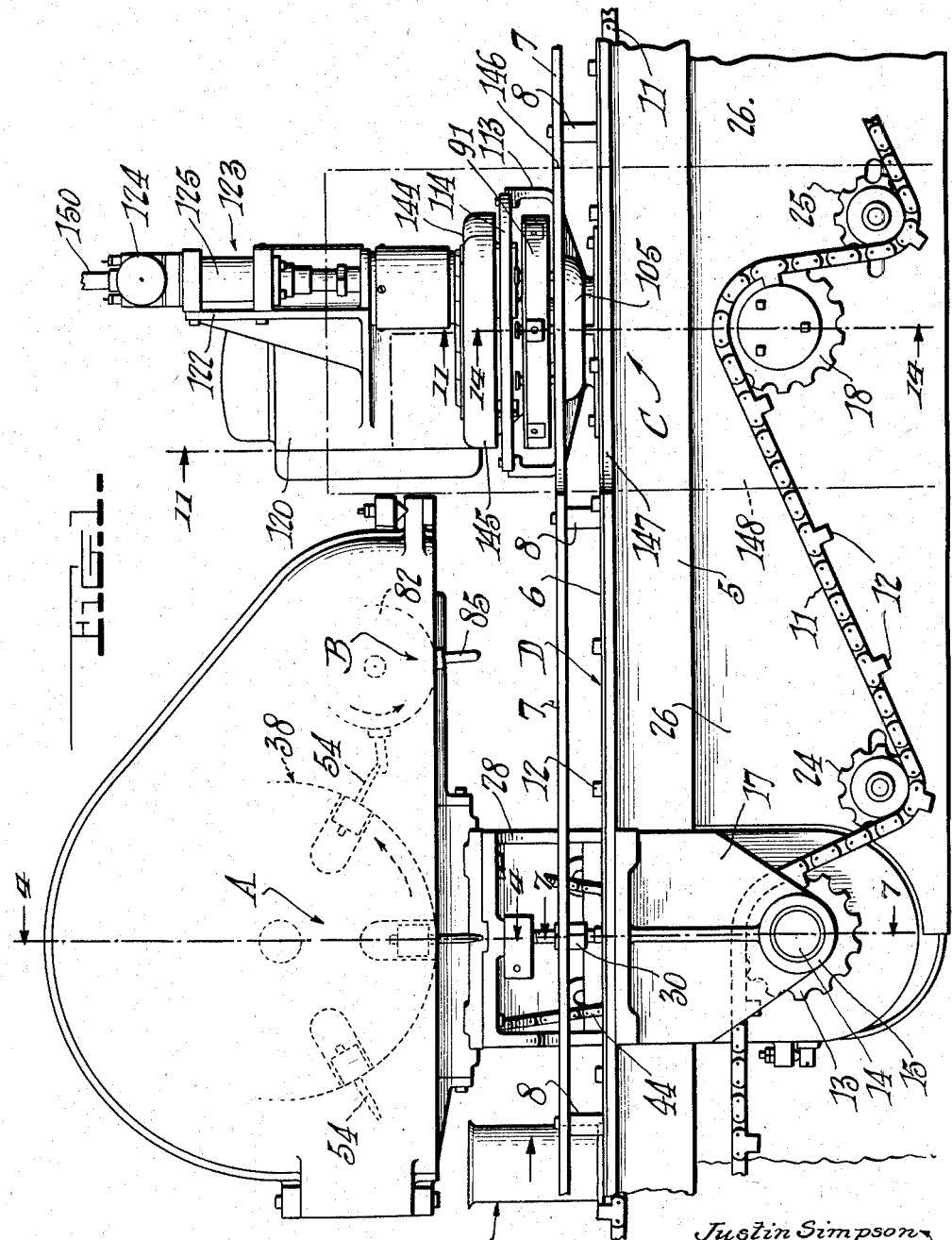

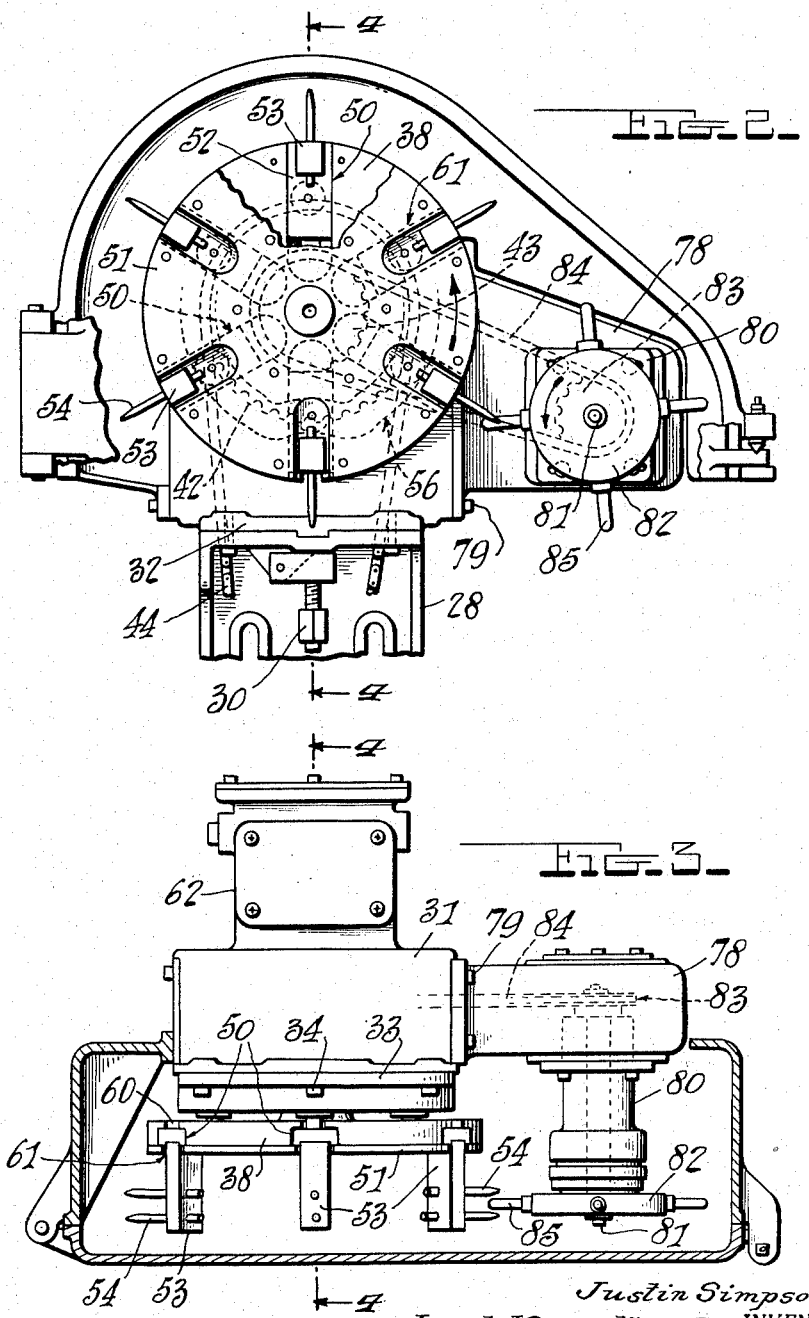

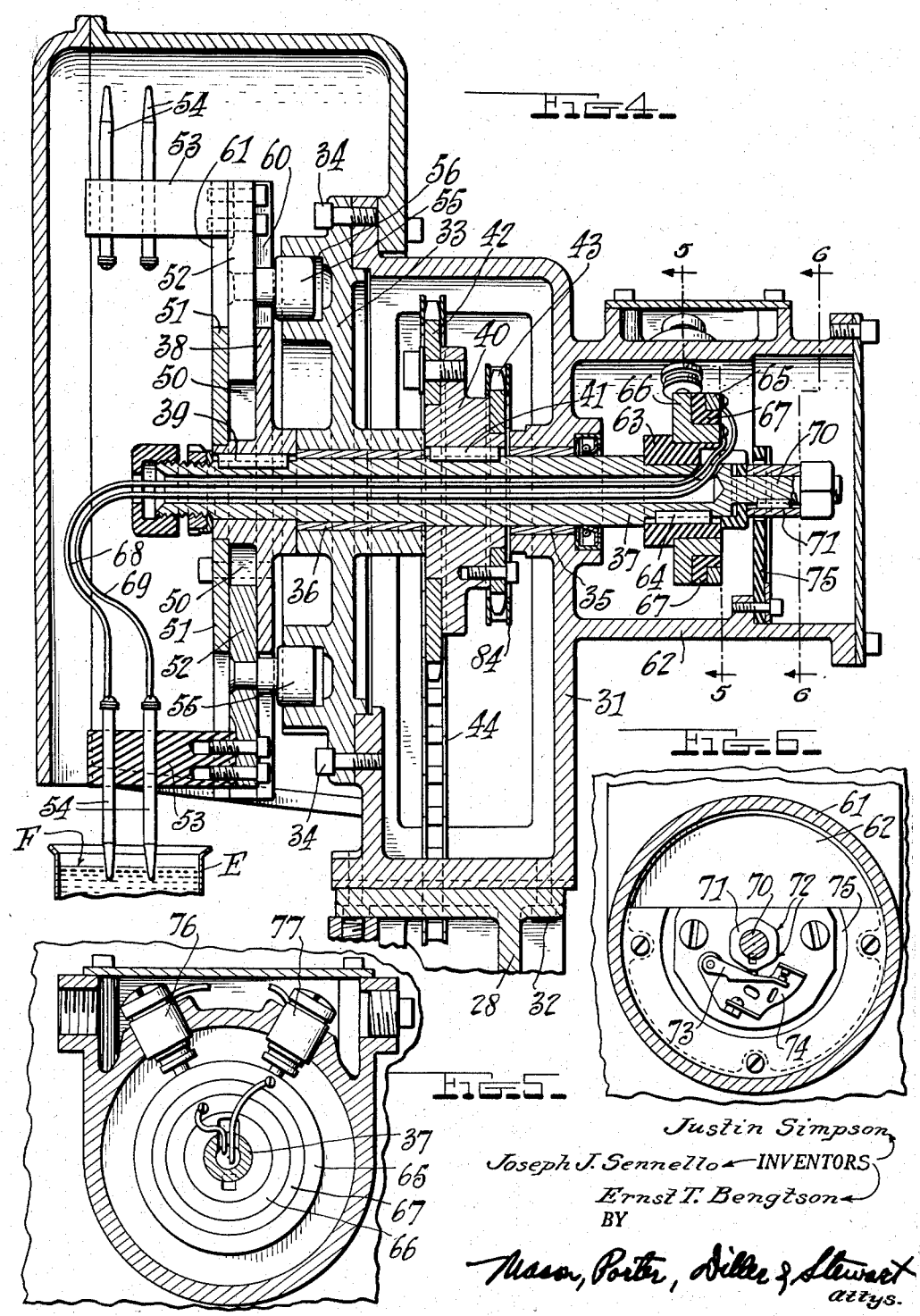

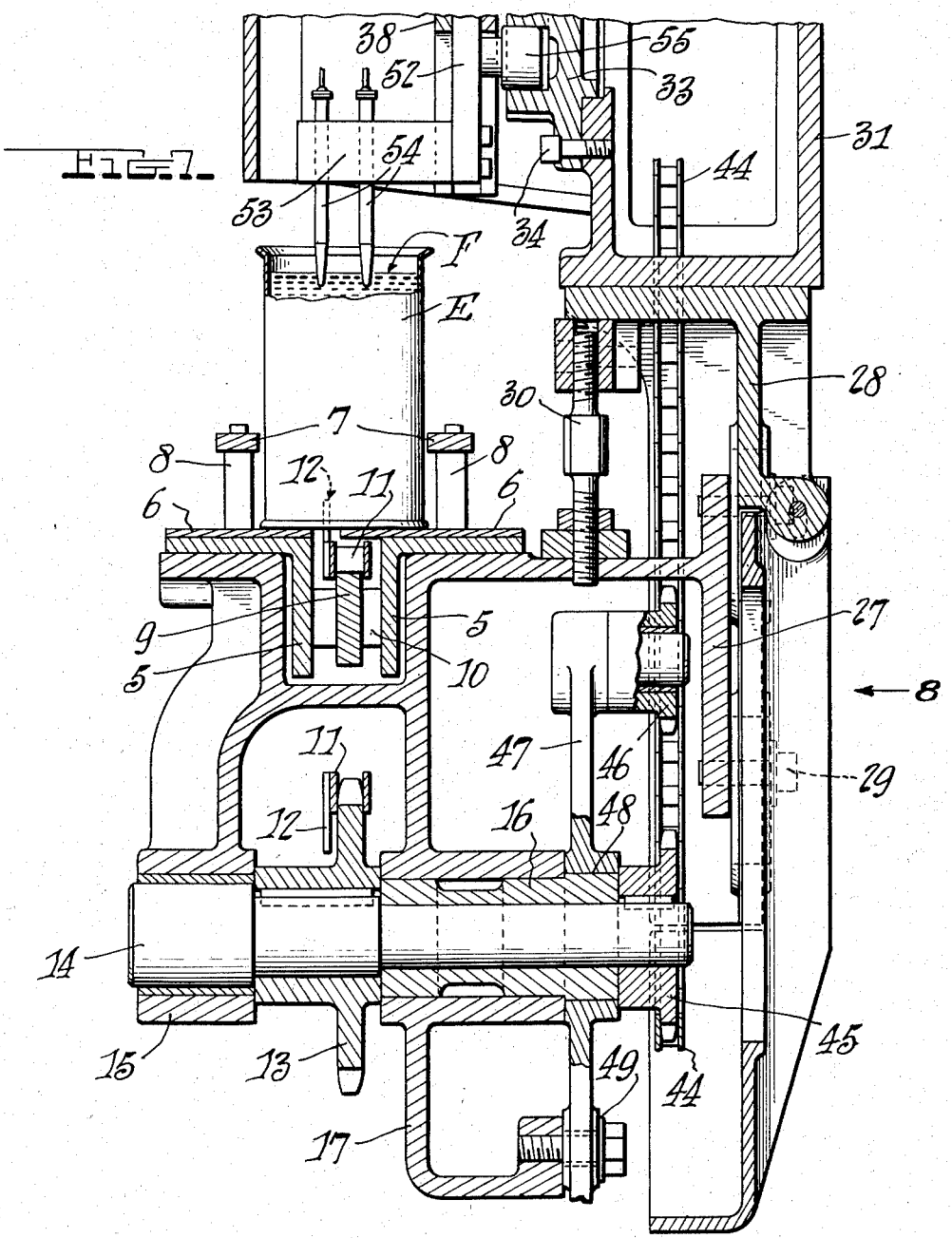

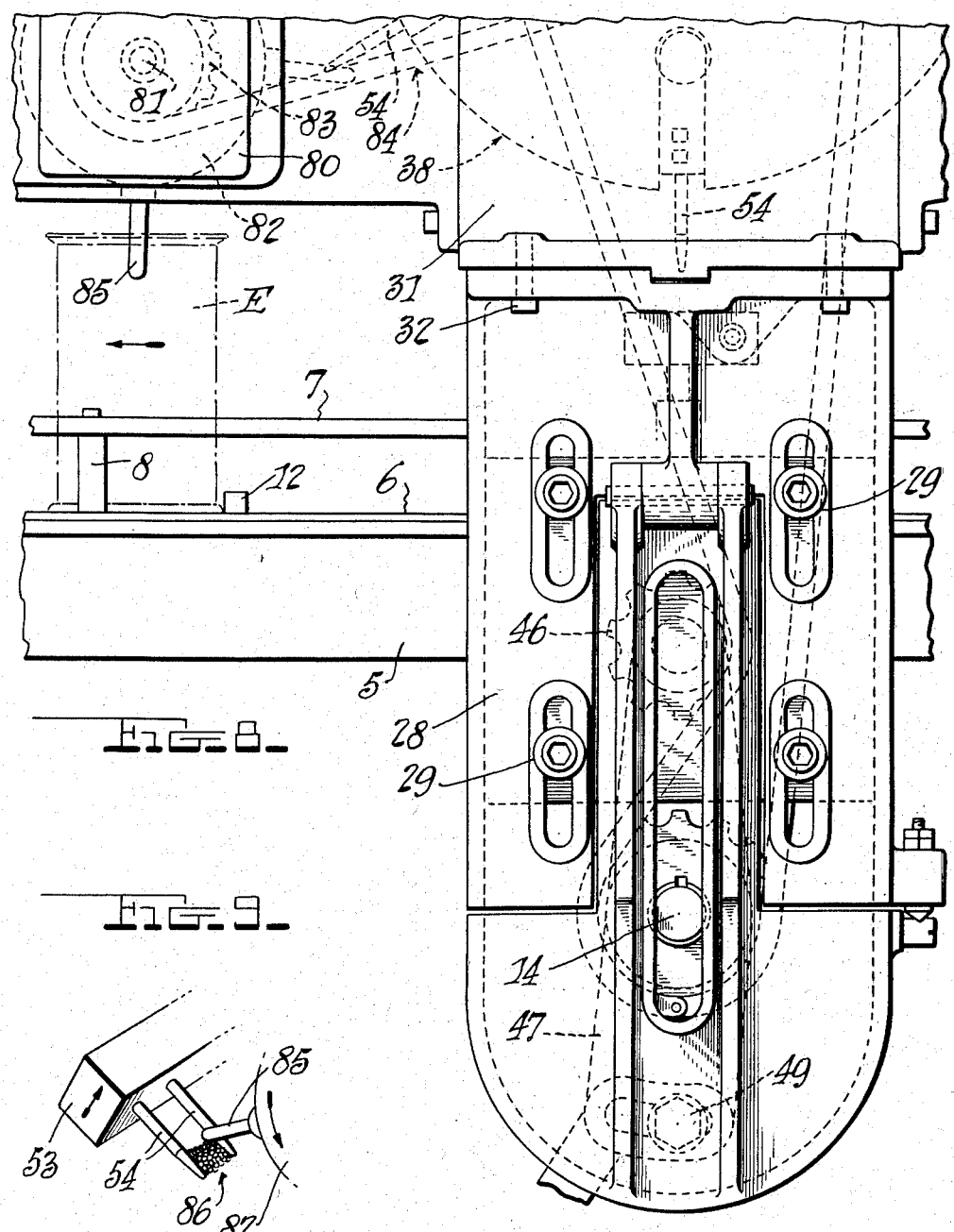

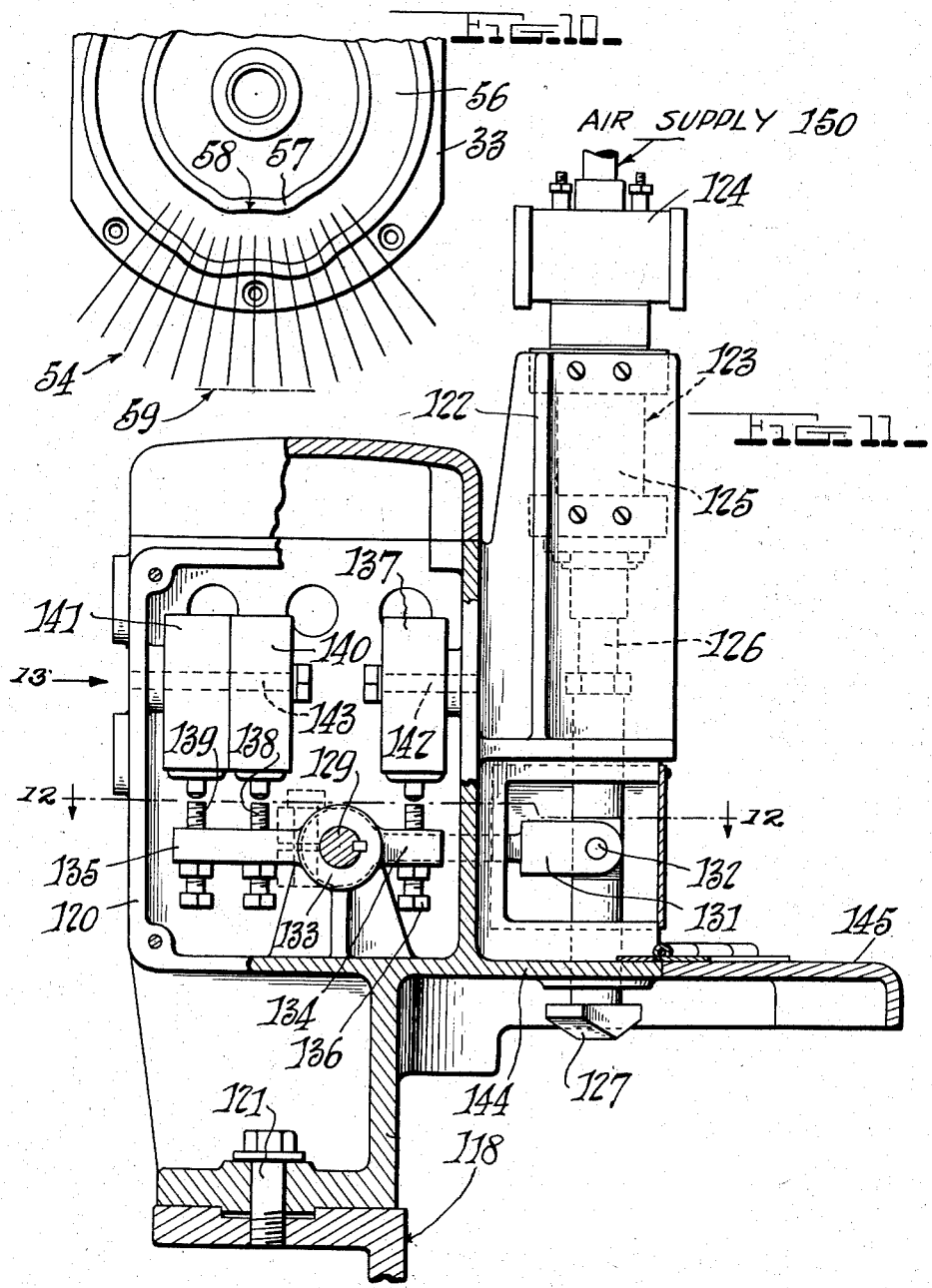

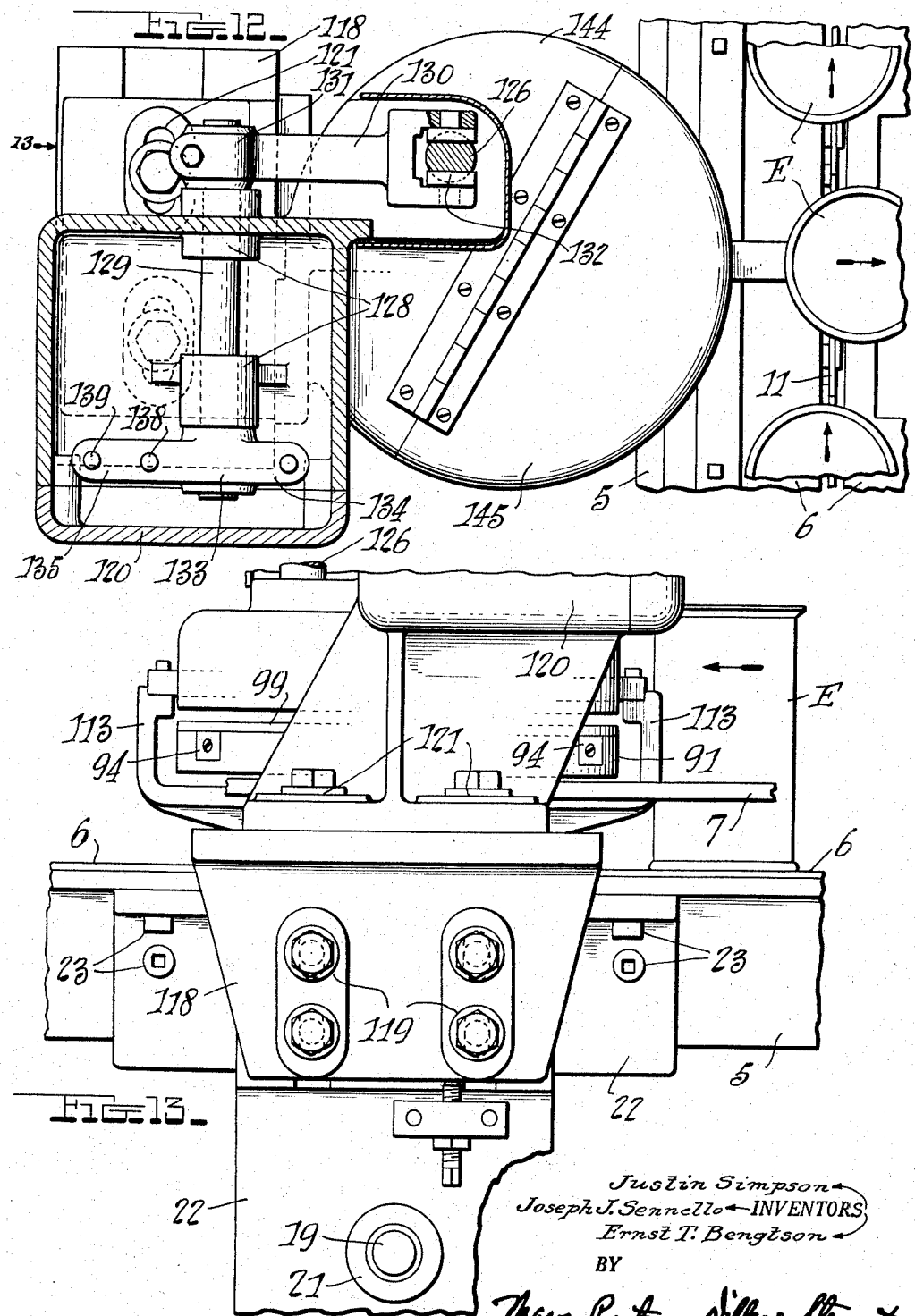

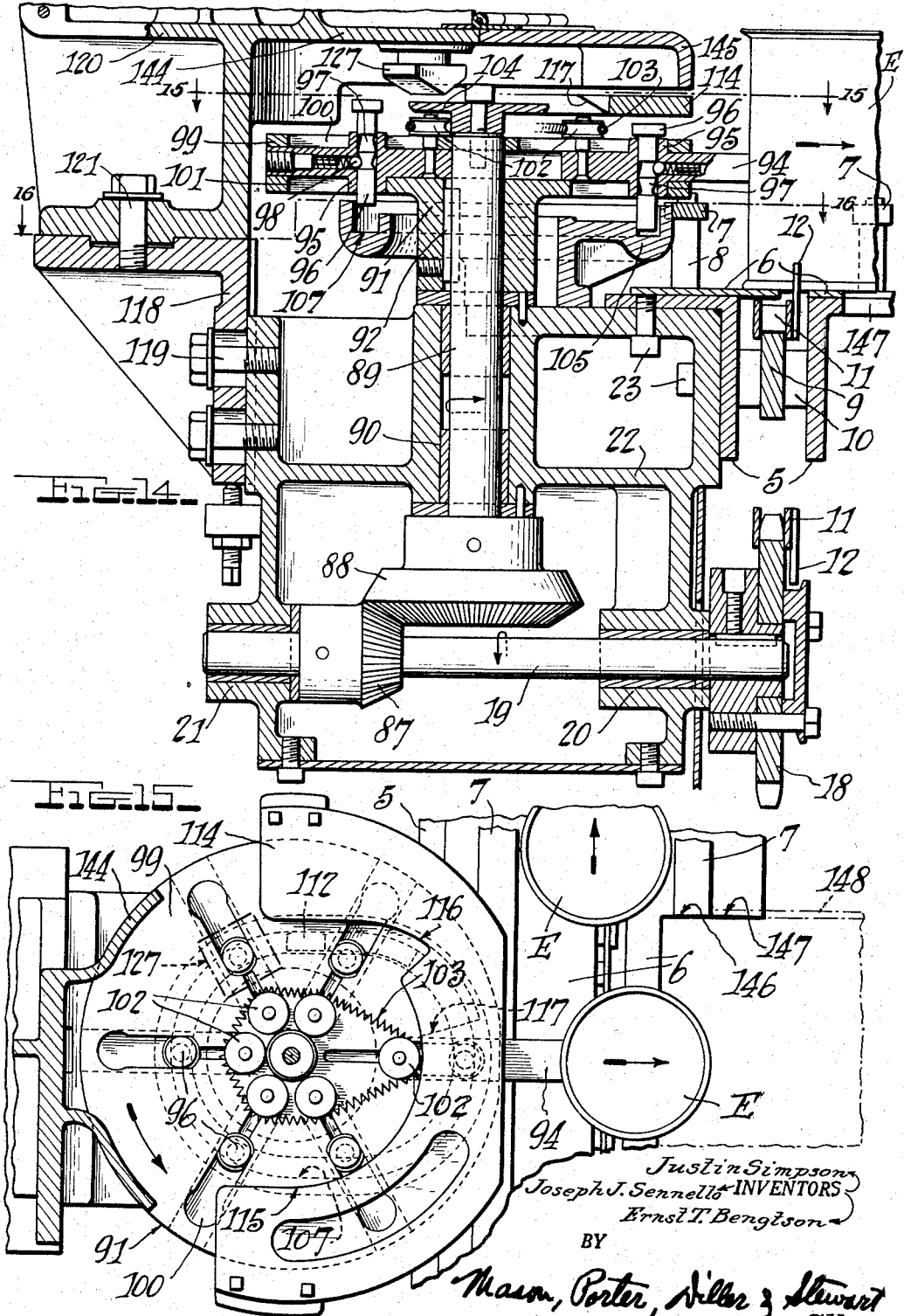

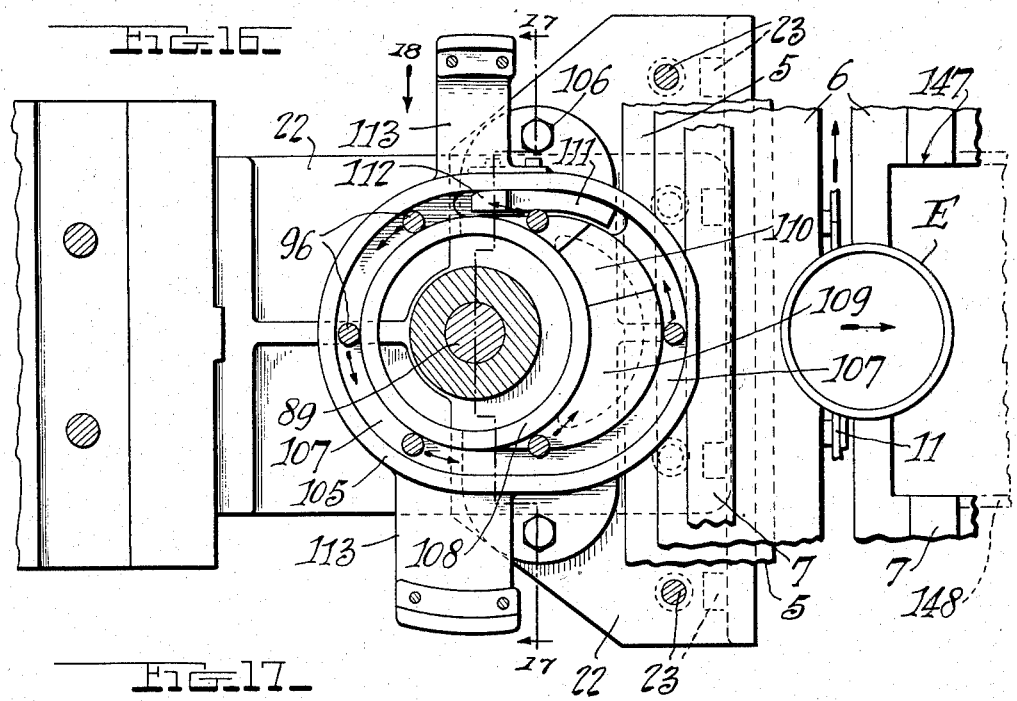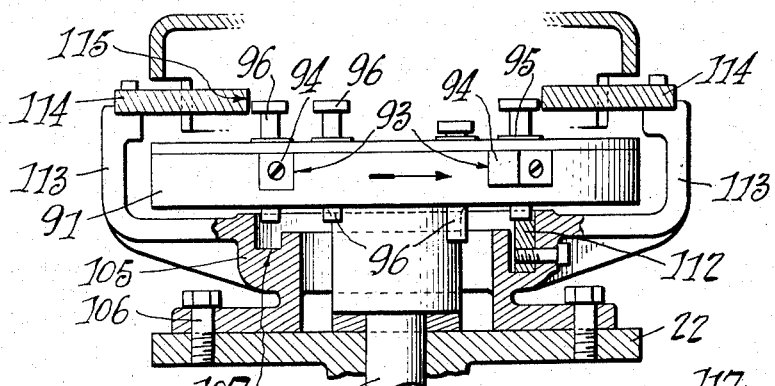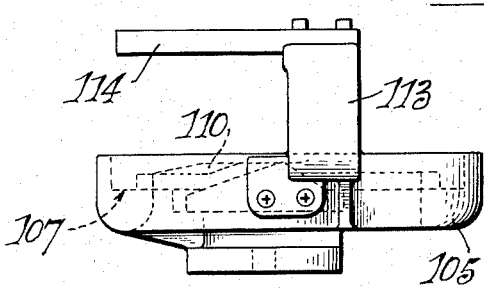

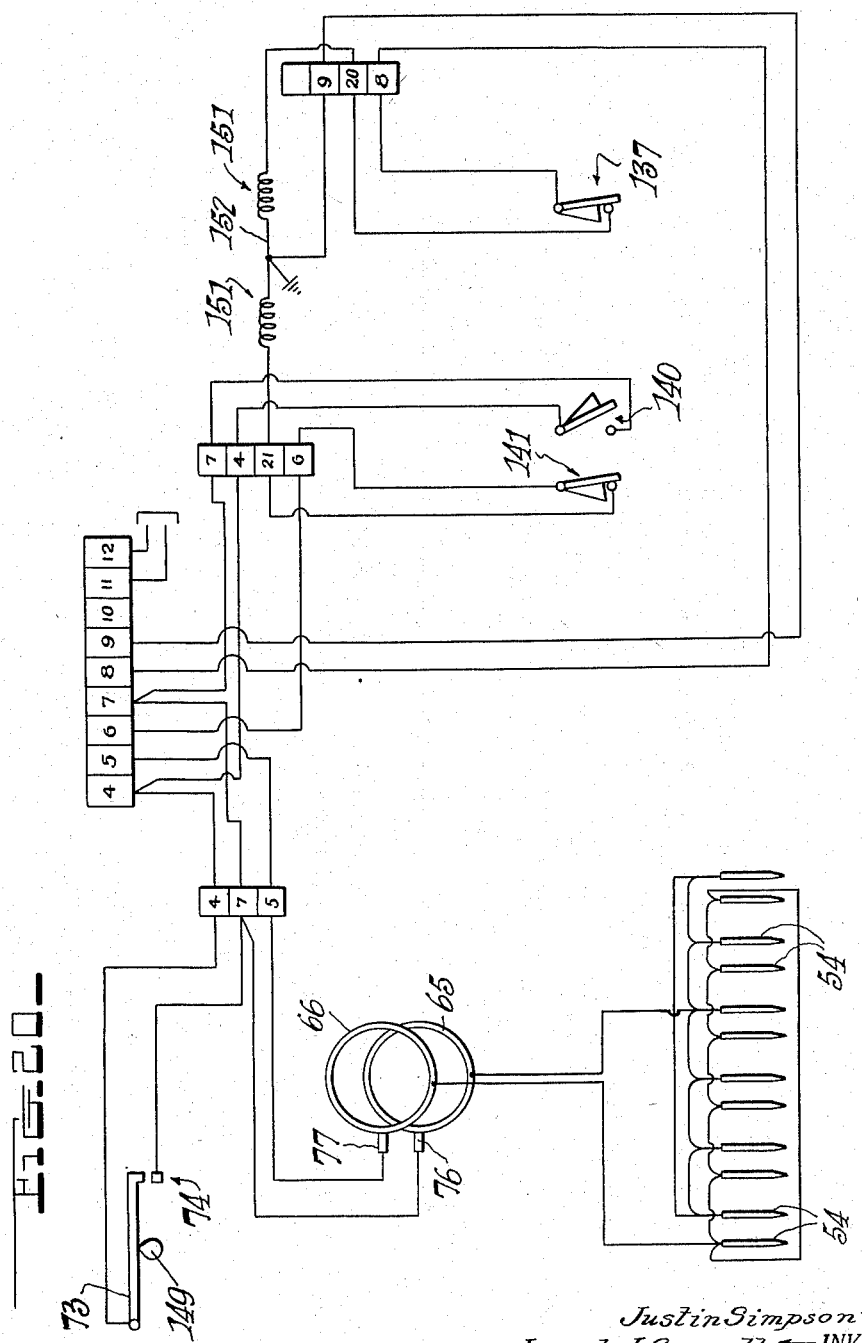

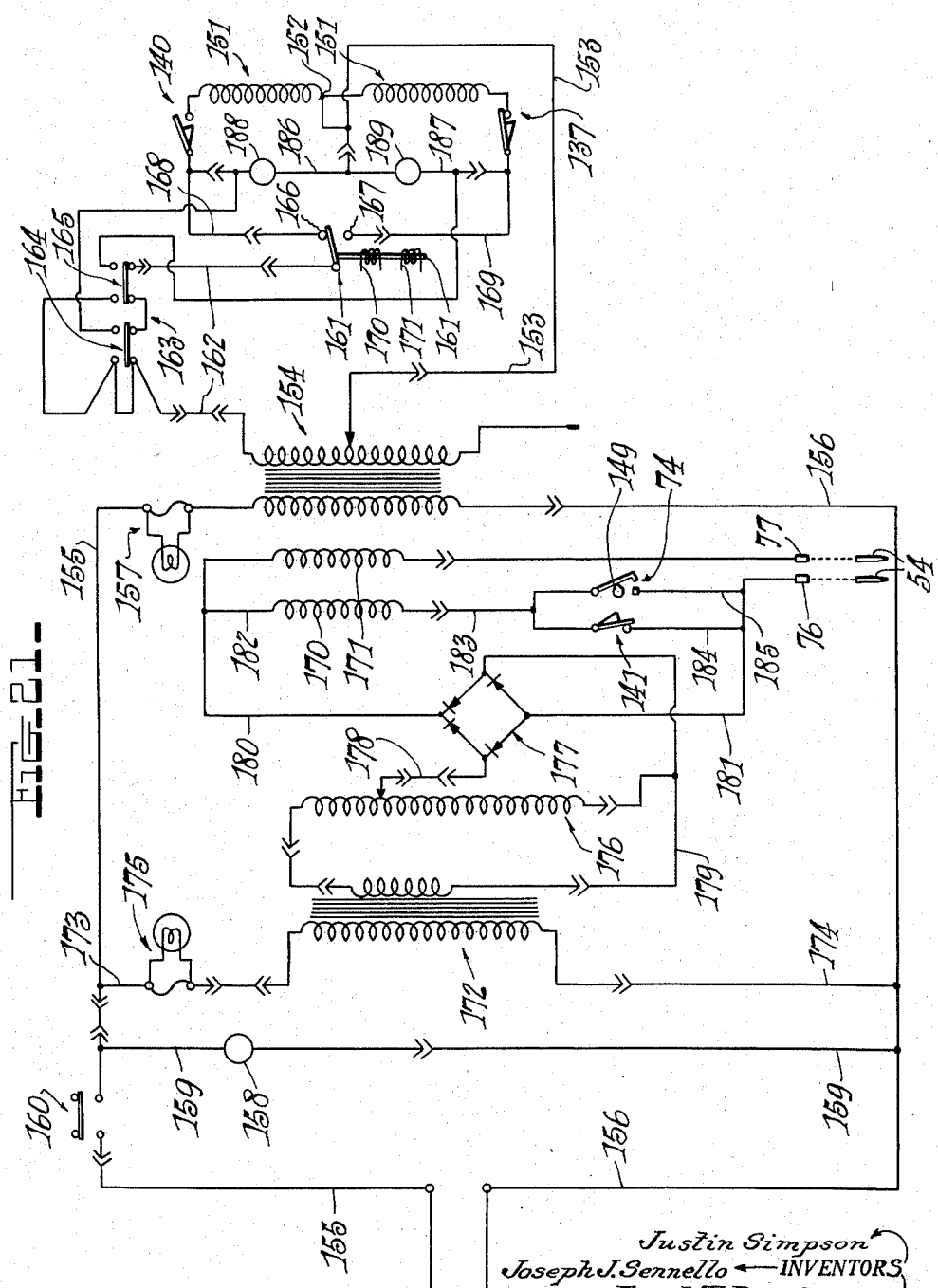

2,907,457

SLACK FILLED CAN DETECTING AND EJECTING APPARATUS

Justin Simpson, Elmhurst, Joseph J. Sennello, Chicago, and Ernst T. Bengtson, North Riverside, Ill., assignors to Continental Can Company, Inc., New York, N.Y., a corporation of Illinois Application October 19, 1953, Serial No. 386,884

17 Claims. (Cl. 209—74)

The invention relates generally to the art of packaging liquids in cans and primarily seeks to provide novel apparatus associated with the means for feeding the filled cans from the filling machine to the closing machine and effective to detect such cans as may be slack filled and eject them from the feeding means so that they will not be delivered to the closing machine and closed therein.

It is common practice at the present time to fill liquid cans in automatic filling machines which operate with great rapidity and are capable of maintaining fill tolerances with a high degree of accuracy. However, even these highly efficient filling machines will slack fill cans at more or less infrequent intervals, and it is essential that means be provided for detecting slack filled cans and ejecting them from the feed line so that they will not be closed and distributed to the consuming public. In the filling of some liquids it is desirable to remove air from the head spaces in the cans before closing the cans. This is accomplished in various ways, and in the case of foaming liquids of which beer forms an example, a favored method of removing the head space air is that of jetting the beer with an inert gas serving to cause the beer to foam and the foam to crowd the air out of the head spaces in the cans. An object of the present invention is to provide an apparatus for detecting slack filled cans and ejecting them from the feed line which includes a slack filled can ejecting means, slack filled can detecting means including spaced probes which are projected down into passing cans for contacting the fill therein, control circuit means connecting the probes and the ejecting means for controlling operation of the latter so as to eject all slack filled cans while permitting all properly filled cans to pass, and jetting means disposed between the detecting means and the ejecting means in position for breaking any foam bridging clinging to fill testing probe pairs so as to assure against false controlling of the ejecting means.

Another object of the invention is to provide an apparatus of the character stated wherein the fill testing probes are arranged in equidistantly spaced relation about a turret rotatable over the passing cans in position for having the probes pass down into the open tops of passing cans, radially reciprocable slides being provided for carryig the probes, and cam means for controlling the positioning of the probes so that the testing end extremities thereof will be held at a predetermined immersion depth over a considerable period of time while a given can under test and the testing probe means are moving together during a testing interval.

Another object of the invention is to provide an apparatus of the character stated wherein the tester probes are arranged in pairs and the jetting means includes a rotor having radially projecting jetting nozzles disposed to enter the open tops of passing cans and also for passing between the probes of the pairs in a manner for breaking up any foam clinging to and bridging across the probes of the pairs.

Another object of the invention is to provide an apparatus of the character stated wherein the slack filled can ejecting means includes a rotor continuously turning about a vertical axis beside the line along which the cans are fed and having thereon radially projectable ejector slide means for directly contacting a can detected as having a slack fill and forcing the same off the feed line.

Another object of the invention is to provide an apparatus of the character stated wherein each of the ejector slides has a pin therein projectable and retractable between effective and ineffective positions, cam means being included and placeable under slack fill detecting means control into position for projecting a pin into its effective position, and other cam means being included for engaging each projected pin in a manner for moving it and the slide by which it is carried to eject the can detected as having a slack fill.

Another object of the invention is to provide an apparatus of the character stated wherein there is included in the ejecting means cam means effective to return each projected pin to its retracted position after the ejection of a can.

Another object of the invention is to provide an apparatus of the character stated wherein there is included spring means common to all of the radially projectable ejector slides and constantly tending to hold them retracted, and wherein the cam means which effects the projection of the slides also controls the retraction thereof.

Another object of the invention is to provide an apparatus of the character stated wherein there is included a safety plate means having a surface facing inwardly toward and concentric to the ejector rotor center and which opposes pins which have not been projected in a manner for preventing inadvertent radial movement of the ejector slides on which they are mounted.

Another object of the invention is to provide an apparatus of the character stated wherein the ejector means is equipped with a cam surface effective for depressing pins so that they can pass beneath and not jam against the safety plate in the event of rotation of the ejector rotor reversely of its normal direction of rotation.

Another object of the invention is to provide an apparatus of the character stated wherein the slack filled can ejecting means is electrically controlled by control circuit means including the probes which are projected into the cans as they are presented one after another at the testing station, and a control relay shiftable between two positions, one in which it brings about an ejection of cans, and one in which it permits cans to pass the ejecting station, means being included for preventing the relay from being operated for every can passing the testing station, and assuring that said relay will be operated only when an adequately filled can is followed by a slack filled can, or vice versa.

Another object of the invention is to provide an apparatus of the character stated wherein there is included in the control circuit means operable at the will of an operator to set the circuit for normal operation in which adequately filled cans will be permitted to pass and slack filled cans will be ejected, or for operation permitting all cans to pass regardless of the condition of the fill, or to eject all cans regardless of the condition of fill.

With the above and other objects in view that will hereinafter appear, the nature of the invention will be more clearly understood by reference to the following detailed description, the appended claims and the several views illustrated in the accompanying drawings.

In the drawings:

Figure 1 is a fragmentary side elevation illustrating the cooperative relation of the slack fill detecting means, the jetting means and the slack filled can ejecting means.

Figure 2 is a fragmentary side elevation illustrating the cooperative relation of the slack fill detecting means and the jetting means, the front cover plate of the encasing housing being broken away.

Figure 3 is a plan view of the parts shown in Figure 2, the encasing housing being shown in horizontal section.

Figure 4 is a vertical cross section taken on the line 4—4 on Figures 1, 2 and 3.

Figure 5 is a vertical cross section taken on the line 5—5 on Figure 4.

Figure 6 is a vertical cross section taken on the line 6—6 on Figure 4.

Figure 7 is a vertical cross section taken on the line 7—7 on Figure 1.

Figure 8 is a rear view of the parts shown in Figure 7, looking in the direction of the arrow 8 on said Figure 7.

Figure 9 is a fragmentary perspective view illustrating the manner in which the jetting means functions to break up any bridging of foam across the cooperating tester probe pairs.

Figure 10 is a face view showing the tester probe projecting and retracting cam and illustrating diagrammatically equidistantly spaced successive positions of a probe pair passing through the fill testing zone.

Figure 11 is a vertical cross section taken on the line 11—11 on Figure 1.

Figure 12 is a horizontal section taken on the line 12—12 on Figure 11.

Figure 13 is a view looking at the parts shown in in Figures 11 and 12 in the direction of the arrow 13 shown on said Figures 11 and 12.

Figure 14 is a vertical cross section taken on the line 14—14 on Figure 1.

Figure 15 is a horizontal section taken on the line 15—15 on Figure 14.

Figure 16 is a horizontal section taken on the line 16—16 on Figure 14.

Figure 17 is a vertical cross section taken on the line 17—17 on Figure 16.

Figure 18 is a detail view illustrating the ejector plunger rotor housing and fixed cam structure looking in the direction of the arrow 18 on Figure 16.

Figure 19 is a fragmentary vertical cross sectional view illustrating the relation of one of the turret carried ejector plungers, its projectable and retractable follower pin, the cooperating pin raising cam and the overlying cam effective to lower any raised pins should the direction of rotation of the turret be reversed.

Figure 20 is a machine wiring diagram showing the series circuit connections of the inner and outer tester probes of the probe pairs with the collector rings and the switch and cam controls.

Figure 21 is a line wiring diagram illustrating the normal positions of the elements in the control circuit when no current is flowing.

In the example of embodiment of the invention herein disclosed, the apparatus includes a testing station A at which the passing cans are tested to determine if the liquid fill therein is adequate, a jetting station B at which a jet of gas may be injected into the fill in each passing can to cause it to foam in a manner for crowding the air out of the head space, and an ejecting station C at which cans detected as having a slack fill are ejected from the feed line so that they will not pass on to the closing machine.

The can feedway is generally designated D, the filled cans are designated E, and the fill in the cans is generally designated F.

The feedway D may comprise a pair of longitudinally extending, laterally spaced angle irons 5 having bed plates 6 thereon which support the cans E as they are being conveyed between the spaced guides 7 which are supported at 8 above the supporting feedway. The chain supporting rail 9 is supported on the spacers 10 between the rails and serves to support the can conveying flight of the chain 11 which is driven in any approved manner (not shown), said chain having its feeder lugs 12 projecting upwardly through the bed for engagement with the cans in the manner clearly illustrated in Figures 1 and 7 of the drawings.

The chain 11 passes over and drives a sprocket 13 secured on a shaft 14 which is rotatable in bearings 15 and 16 provided therefor in the support casting 17 which is suspended from the feedway rails 5 at the testing station A, as clearly illustrated in Figures 1 and 7. The chain also passes over and drives a sprocket 18 secured on a shaft 19 which is rotatable in bearings 20 and 21 provided therefore on a support casting 22 which is secured at 23 to one of the rails at the ejector station. See Figures 1, 14 and 16. The chain also passes over an idler sprocket 24 just beyond the previously mentioned sprocket 13 at the testing station and over an idler sprocket 25 just beyond the sprocket 18 at the ejecting station, each said idler sprocket being adjustably supported on the frame skirt 26 secured to and depending from one of the feedway rails 5.

The casting 17 includes an upright support pad 27 to which a tester head supporting bracket 28 is vertically-adjustably secured as at 29, there being included turnbuckle means 30 for effecting vertical adjustments of said supporting bracket. See Figures 7 and 8. An open front tester head casting 31 is secured at 32 upon the bracket 28, and in the open front of this casting a cam plate 33 is removably secured as at 34. See Figures 2, 3 and 4. Aligned bearings 35 and 36 are provided in the casting 31 and the plate 33 respectively and serve to rotatably support a hollow shaft 37 whereon the tester rotor 38 is keyed as at 39. A driving head 40 is keyed at 41 on the shaft 37 and has a large sprocket 42 and a smaller sprocket 43 secured thereon. Rotation is imparted to the tester rotor by a chain 44 which passes over the sprocket 42 and over an intermediate idler or tightener sprocket 46 carried by an arm 47 which is rockably mounted at 48 on the bearing 16 and is adjustably secured at 49 to the casting 17 in the manner clearly illustrated in Figures 7 and 8.

The tester rotor 38 is equipped with six equidistantly spaced radial slideways 50 which are covered by a removably mounted face plate 51, and in said slideways slides 52 are reciprocably mounted. Each slide carries an insulator block 53 from which radially project a laterally spaced pair of tester probes 54. Each slide also is equipped with a follower roller 55 which is movable in the face groove 56 of the adjacent cam plate 33. It will be apparent by reference to Figure 10 that the major part of the cam groove 56 is concentric to the axis of the tester rotor 38, but at the lower portion of the cam the groove includes a probe-projecting downward extension 57. Included in the probe-projecting downward extension of the cam groove is a reverse dwell arc portion 58 which is effective to cause the probe ends to be immersed in the passing cans a predetermined definite distance over a considerable interval of travel of the cans during the testing of the fill. The dwell portion 58 of the cam groove is so shaped and positioned that it causes the projected end extremities of the probes to travel along a substantially straight horizontal line as indicated at 59 during the considerable interval of time or testing period during which the probes remain immersed in the cans, or rather the fill therein when the cans are adequately filled. It will be observed by reference to Figures 2, 3 and 4 of the drawings that the rotor 38 and the closure plate 51 are suitably slotted at 60 and 61 respectively to permit radial movement of the slide followers 55 and the insulator blocks 53.

The casing 31 includes an extension 62 providing a chamber into which the end of the shaft 37 extends and wherein a rotor 63 of insulating material is keyed as at 64 on said shaft. See Figures 4, 5 and 6. Collector rings 65 and 66 are mounted on the rotor 63, being separated by an insulating ring 67, and conductor wires 68 and 69 connect the inner and outer probe sets to said collector rings. It is to be understood that the inner and outer probe sets are connected in series in the manner diagrammatically illustrated in Figure 20 and as more specifically referred to in the description of the control circuits which is to follow. The tester rotor shaft includes a reduced end portion 70 which carries a cam 71 having multiple lobes or high points 72 corresponding in number to the number of sets or pairs of the tester probes 54. The cam lobes or high points 72 are engageable with the movable arm 73 of a control timer switch 74 which is supported on the insulator plate 75 in the chamber within the casting extension 62. Brushes 76 and 77 engage the individual collector rings 65 and 66 and are connected in the control circuit in the manner diagrammatically illustrated in Figures 20 and 21.

A housing 78 is secured at 79 to the casting 31 and carries a housing extension 80 wherein the shaft 81 of the jetter rotor 82 is rotatably supported, extending into the housing 78 where a sprocket 83 is secured thereon. The sprocket 83 and the shaft 81 on which it is mounted are driven by a chain 84 passing over the sprocket 83 and over the previously mentioned sprocket 43 of the tester rotor. See Figures 2, 3 and 4. Radially projecting jetter nozzles 85 are carried in equidistantly spaced relation on the rotor 82 and the rotor is driven in timed relation to the feeder chain 11 so that one of the nozzles will project into the fill in each can passing under the jetter rotor. It is a purpose of the jetting equipment to project a jet of gas into the fill in each can so as to cause the liquid of the fill to foam and crowd air from the head space in the cans. The manner of directing the gas to and through the jetting nozzles is not illustrated herein because the jetting, per se, forms no part of the present invention, except insofar as the jetting nozzles act as foam breakers in combination with the tester rotor and the particular placement of the probe pairs therein. The tester rotor 38 and the jetting rotor 82 bear the relation clearly illustrated in Figure 3 and rotate in such timed relation that one of the jetting nozzles 85 will pass between the probes of each pair of probes 54 as they leave a can in the manner clearly illustrated in Figures 2, 3 and 9 so as to break up any bridging of foam as indicated at 86 in Figure 9.

At the ejecting station C the previously mentioned shaft 19 has a bevel pinion 87 fixed thereon which meshes with a bevel gear 88 secured on the lower end of a shaft 89 which is uprightly disposed and rotatable in a bearing 90 provided therefor in the casting 22. An ejector rotor 91 is keyed as at 92 on the upper end of the shaft 89 and has six slideways 93 formed in equidistantly spaced relation and radially therein to slidably receive the ejector slides 94. Each slide 94 has an upright bearing 95 intermediately of the ends thereof in which an actuator pin 96 is vertically-reciprocably mounted. Each pin is equipped with an upper and lower recess pair for receiving a spring pressed detent ball 98 which is effective to hold the pin in its upwardly shifted or retracted position illustrated at the left in Figure 14 or in its depressed or downwardly projected position illustrated at the right in said figure. A cover plate 99 is removably secured on the rotor over the slideways 93 and is equipped with radial slots 100 to permit movement of the slides in the manner clearly illustrated in Figures 14 and 15. The base of the rotor also is equipped with radial slots 101 for permitting the radial movement of the slides. Each slide carries a grooved roller 102 projecting upwardly therefrom, and an endless coil spring 103 embraces all rollers in the manner clearly illustrated in Figures 14 and 15 and constantly tends to retract all slides to the retracted position illustrated at the left in Figures 14 and 15, in which position the slide roller will be disposed under the overhang flange of the cap 104 which is removably secured on the upper end extremity of the shaft 89.

A stationary cam 105 is secured as at 106 on the casting 22 in position for surrounding the shaft 89 in the manner clearly illustrated in Figures 14 through 17. The cam has a generally elliptical groove 107 opening upwardly therein and in which to receive the lower end extremities of the pins 96 whenever they are depressed from the raised or retracted position illustrated at the left in Figure 14 to the projected or lowered position illustrated at the right in said figure. The generally elliptical groove is best illustrated in Figure 16 and is defined in part by the circular concentric flange 108. An intermediate level floor extension 109 is provided in the cam and includes an inclined portion 110, said portion being inclined upwardly in the direction of rotation of the pin carrying turret, or downwardly considering a reverse direction or clockwise movement of the turret. This inclined portion 110 is disposed near the advance or lifted end portion 111 of a pin replacer cam 112 which is removably mounted in the cam groove 107 in the manner clearly illustrated in Figures 16 and 17. This cam is shown in profile in Figure 19 and is effective to lift and return to the elevated position shown at the left in Figure 14 any pins 96 which have been depressed or projected to the position illustrated at the right in Figure 14.

The cam 105 has extension arms 113 whereon is supported a guard plate 114 having a concentric inner edge 115 which lies closely adjacent the heads of the pins 96 when they are in their elevated or retracted position in the manner clearly illustrated in Figures 15 and 17 to prevent inadvertent outward movement of the slides 94. The guard plate 114 has a clearance 116 which is clearly illustrated in Figure 15 and is effective to permit normal lifting of the pins 96, or in other words, retraction thereof from the lowered or projected position illustrated at the right in Figure 14 to the upper or retracted position illustrated at the left in said figure. The guard plate 114 also has a cam surface 117 which will be effective to depress elevated pins 96 should reverse movement be imparted to the rotor 91, as by hand inching for inspection or repair purposes. The functioning of the pin depressing cam surface 117 is clearly illustrated in Figure 19.

A support bracket 118 is vertically-adjustably mounted on the casting 22 as at 119. See Figures 1, 11, 12 and 13. A control support housing 120 is longitudinally-adjustably mounted on the bracket 118 as at 121, and said housing has an upright bracket extension 122 which supports a well known Bellows electrically controlled, air powered control cam placing unit generally designated 123 and which includes the electrical control head 124 and the depending air cylinder 125. This Bellows unit will be referred to in greater detail hereinafter. The vertically reciprocable plunger 126 of the air cylinder carries the pin depressing cam 127 at its lower end, and it will be observed by reference to Figures 11, 12 and 15 that the cam 127 overlies the circular path of travel of the pins 96. The position of the cam over the path of travel of the pins 96 is diagrammatically illustrated in Figure 15, and it will be readily apparent that by reason of this particular relation of the cam and the path of travel of the pins, the vertical adjustment provided at 119 and the horizontal adjustment provided at 121, very accurate placement of the cam 127 with relation to the travelling pins 96 can be provided. Within the housing 120, there are provided horizontal bearings 128 in which a shaft 129 is rockably mounted. Without the housing a crank arm 130 is secured on the shaft 129, and said arm is pivotally connected at its upper end as at 132 to the previously mentioned vertically reciprocable plunger 126. Within the housing 120 a rocker member 133 is secured on the shaft 129, and said rocker member has a short arm 134 and a long arm 135. The short arm carries an adjustably mounted switch actuator 136 which underlies the control plunger of a control switch 137 and the long arm has an adjustably mounted switch actuator 138 and a similarly mounted switch actuator 139 which underlie the control plungers of two control switches 140 and 141. The switch 137 is secured as at 142 in the housing, and the switches 140 and 141 are secured at 143 in said housing. The housing also carries a guard 144 overlying the ejector rotor 91 and including a hinged section 145 which can be swung upwardly to render the ejector rotor mechanism readily accessible.

It will be apparent by reference to Figures 1, 14, 15 and 16 that the outer guide rail 7 is cut away at 146 and the outer angle iron 5 and overlying feedway plate of the cam feedway are cut away as at 147 opposite the ejector rotor 91 to form a clearance through which slack filled cans can be ejected by the projected slides 94 into a receiving chute or receiver 148.

In the practical operation of the apparatus the filled cans E are moved along in equidistantly spaced relation over the feedway D by the lugs 12 of the feeder chain 11, and the parts of the apparatus described in detail hereinabove are driven in proper timed relation by the sprocket and chain and gear driving connections previously described. The tester rotor 38 rotates about its horizontal axis, and as each can passes under the periphery of the rotor one of the rotor slides will be projected by the cam portion 57 to immerse the probes 54 a predetermined definite distance into the fill in the can, assuming that a proper fill has been provided therein. As previously described, the cam dwell portion 58 is effective to cause the lower end extremities of the probes to travel along at a substantially horizontal level during a considerable travel of the can as indicated at 59 in Figure 10, thereby to provide a substantial test interval over which the probe ends will remain at the predetermined definite test depth in the cans.

As each can is passing the jetting station B one of the nozzles 85 of the jetting rotor 82 will be immersed in the fill and inject a jet of gas into the fill to cause a foaming of the beer or other foaming liquid which will be effective to crowd air out of the head space of the can and maintain the condition of air exclusion until the can is closed in the closing machine. As before stated, the manner of directing the gas to and through the jetting nozzles is not illustrated herein because the jetting, per se, forms no part of the present invention except insofar as the jetting nozzles act as foam breakers in combination with the tester rotor and the particular placement of probe pairs thereon. It will be apparent by reference to Figures 1, 2, 8 and 9 that as each pair of probes 54 comes up out of a can, one of the jetting nozzles 85 moves through the space between the probes in a manner for breaking any bridging of foam across said space. This utilizing of the jetting nozzles as a mechanical foam breaking means is quite advantageous because such a foam bridging, if not disrupted, might cause the probes at their next insertion into a can to bring about an indication that the can has been adequately filled when the can might actually be slack filled.

Assuming that all cans passing the testing station A have been adequately filled the control circuits connected with the probes 54 and other apparatus parts will be conditioned to maintain the pin depressor cam 127 in its ineffective, elevated position, as shown in Figures 11 and 14. Accordingly all of the pins 96 on the ejector rotor 91 will remain in the elevated position shown at the left in Figure 14, and the attached ejector slides will remain fully retracted so that all cans will be permitted to pass the ejecting station.

Whenever a probe projection into a can passing the testing station A fails to contact liquid therein and thereby indicates a slack fill, the control circuits will be conditioned to bring about a lowering of the cam 127 to its effective, pin depressing position in which it will intercept and depress the next oncoming pin 96 to lower its bottom end extremity into the cam groove 107. With the pin 96 thus lowered it will be caused to follow the path of the elliptical cam groove 107, instead of its normal circular path about the flange 108, and thus the attached ejector slide 94 will be projected in the manner indicated at the right in Figures 14 and 15 to force the can detected as having a slack fill off the feedway into the receiving chute or receiver 148. It is to be noted that the probe pairs 54 on the testing rotor 38 and the pin and slide complements 96, 94 on the ejector 91 correspond in number, and these rotors and the feed chain 11 and the operation of the control devices are cooperatively timed so that the detection of a slack filled can at the testing station will result in the setting of just the right pin 96 and bring about a projection of the attached slide 94 at just the right time to eject that particular can at the ejecting station C.

It is to be understood that should there be a succession of slack filled cans the pin depressor cam 127 would be retained in its lowered position to bring about an ejection of all such cans, just as said cam would be retained in its elevated position to permit all cans to pass so long as properly filled cans succeed one another. On the other hand, each time a slack filled can follows a properly filled can the controls will function to lower the cam 127 to bring about an ejection of the slack filled can at the ejecting station, and if the next can is properly filled the control devices will function to again lift the cam before it can depress the next oncoming slide pin 96.

The operation of detecting and ejecting slack filled cans primarily is controlled by the three previously mentioned switches 137, 140 and 141, in conjunction with the previously mentioned timing switch 74. The switches 137, 140 and 141 are actuated by the rocker member 133, 134, 135 through movement of the Bellows air cylinder plunger 126, and the switch 74 is actuated by the cam directly on the tester rotor shaft 37. As before stated the switch actuator cam 71 may have switch opening lobes 72 thereon corresponding in number to the number of tester probe pairs 54 so as to time the detecting period by opening the switch momentarily during each period of immersion of the probes in a can at the predetermined definite depth, or a cam 149 having a single lobe and rotated once for the passage of each pair of probes can be used, if desired, as shown in Figures 20 and 21.

The Bellows electrically controlled, air-powered valve actuator 123 previously mentioned is a well known structure purchased on the open market and detailed illustration and description thereof is deemed unnecessary herein. An example disclosure is to be found in Figure 6 of U.S. Letters Patent 2,755,762, issued to Lawrence F. Glowen and Joseph J. Sennello on July 24, 1956, entitled Magnetically Operated No-Can No-Feed Control. In this actuator and control device pressure fluid from the source duct 150 is alternately directed to opposite ends of the cylinder 125 under control of the head 124 wherein the shiftable control valve is shifted from one end to the other by the energizing of the coils of the magnets at the opposite ends of the control head 124. A wiring diagram for the apparatus is shown in Figure 20 and should be considered in connection with the line wiring diagram of Figure 21. In these diagrams the coils of the control head 124 are indicated at 151, it being understood that the energizing of one will bring about a fluid pressure shifting of the air cylinder plunger 126 to lift the pin depressor cam 127, and an energizing of the other will bring about a reverse movement of said plunger.

The magnet coils 151 are connected at their proximate ends at 152, and the connection 152 is in turn connected by a conductor 153 with the step-down transformer generally designated 154 and which is connected with the power in-put lines 155 and 156. This transformer serves to reduce the service current to eight volts for use in this particular control system. A fuse and blown fuse indicating light means may be included at 157 if desired, as shown in Figure 21. An "on" pilot light 158 may be connected at 159 across the power in-put lines, and an "off-on" selector switch 160 may also be included in one of said lines.

As before stated, the apparatus wiring diagram of Figure 20 should be considered in connection with the line wiring diagram of Figure 21, the latter showing the conditions of the circuit elements when no current is flowing, in which condition the pin depressing cam 127 is in its effective lowered or pin depressing position. It will be observed that when the cam 127 is in this lowered position the switches 137 and 141 are closed and the switch 140 is open. The switches 137 and 140 are respectively opened as the air cylinder plunger 126 reaches one or the other of its travel limits and serve as a means for conserving the air which is employed in the operation of the cylinder and plunger equipment.

A two coil relay 161 is connected at 162 with the transformer 154 through a selector switch means generally designated 163 and including the independently operable switch elements 164 and 165, and the selective control contacts 166 and 167 of the relay are connected by the conductors 168 and 169 with the coils 151 of the Bellows control head 124 through the respective switches 140 and 137. The coils of the relay are designated 170 and 171 and are indicated in mechanical relation on the relay at the right in Figure 21 and also in the detecting circuit connection at the center of said figure. It will be apparent by reference to Figure 21 that the detecting circuit includes an isolation transformer 172 connected by conductors 173 and 174 with the power in-put lines 155 and 156, one said conductor having a fuse and blown fuse indicating light means 175 connected therein if desired. The voltage from the transformer 172 is directed in selective capacity through the transformer 176 to a selenium rectifier 177 through the conductors 178 and 179, and the rectified D.C. current flows from the rectifier through one conductor 180 and through the relay coil 171 to the collector ring contacting brush 77 and through the other conductor 181 directly to the collector ring contacting brush 76 as shown in Figure 21. The other relay coil 170 is connected by the conductor 182 with the conductor 180 and through the conductor 183 and conductors 184 and 185 with the conductor 181 through the switches 141 and 74 respectively.

The switch 141 being normally closed, coil 170 of the two coil relay 161 is normally energized, but the pull of the single energized coil 170 is sufficient to operate the relay 161 and a lifting of the plunger 126 and cam 127 will not be effected. When the probes 54 enter a slack filled can or an empty can this condition will continue to exist and the cam 127 will remain in its lowered, pin depressing position. By reference to Figure 20, it will be noted that all of the outer probes 54 are connected in one series, and all of the inner probes are connected in another series, each series being connected to a collector ring as shown.

However, when a given pair of probes 54 is immersed in the fill of an adequately filled can, the liquid serves as a conductor between the probes of the pair, with the result that the coil 171 of the control relay 161 also will be energized and thereby supplement the pull of the coil 170. This joint energization of the control relay coils 170 and 171 will cause the relay to function in a manner for closing a control circuit through the contact 167 and conductor 169 and energizing the coil 151 which is effective to bring about a lifting of the plunger 126 and cam 127. When the plunger 126 is lifted, the switch 141 will be opened and will remain open as long as the plunger is in its cam elevated position. Either coil 171 or 170, when energized, is sufficient to hold the relay contact switch closed and the plunger and cam in the elevated position, but both coils 171 and 170 must be energized to shift the control relay switch from the open to the closed position and thereby lift the plunger.

While full cans are being tested, the switch 141 remains open, and when the switch 74 is opened by the timing cam 72 or 149 while a probe pair 54 is immersed in a liquid fill, the coil 171 is energized for retaining the control relay in the closed position. Before the probes 54 of a pair leave the liquid fill the cam 72 or 149 will move to bring about a closing of the switch 74 so that the coil 170 of the control relay 161 is held energized after the probes are withdrawn from the can and the previously energized coil 171 is de-energized. This arrangement prevents the relay from being operated for every passing can, it being operated only when an adequately filled can is followed by a slack filled can, or vice versa.

The normal condition of the selector switch means 163 is shown in Figure 21, that is with the switch elements 164 and 165 both in contact with the lower contact sets as viewed in said figure. It will be noted that a conductor 186 connects the conductor 168 with the proximate ends of the coils 151 at a point between the control relay contact 166 and the switch 140, and a conductor 187 connects the conductor 169 with the proximate ends of said coils at a point between the control relay contact 167 and the switch 137. It will also be apparent by reference to Figure 21 that the selector switch contacts are so connected by suitable conductors with the transformer 154, the control relay 161 and the conductors 186 and 187 that should the selector switch element 165 be moved from its Figure 21 position to a position in which it bridges the overlying set of contacts, the element 164 being left in the Figure 21 position, the control circuit would be conditioned to allow all cans to pass regardless of the condition of fill therein. Similarly, by shifting the element 164 to a position in which it bridges the overlying set of contacts, the element 165 being left in its Figure 21 position, the control circuit would be conditioned to reject all cans regardless of the condition of fill therein. A "reject" pilot light 188 may be connected in the conductor 186 to signal to an operator when the circuit has been set to reject all cans regardless of the condition of fill, and a "pass" pilot light 189 may be connected in the conductor 187 to signal to an operator when the circuit has been set to permit uninterrupted passage of all cans regardless of the condition of fill.

While example structures embodying the invention have been disclosed herein it is to be understood that variations may be made in said structures without departing from the spirit and scope of the invention as defined in the appended claims.

We claim:

1. In apparatus of the character described, means for feeding filled cans in processional order, slack filled can ejecting means, slack filled can detecting means including spaced probe pairs projectable down into passing cans for contacting the fill therein, control circuit means connecting the probes and the ejecting means for controlling operation of the ejecting means to eject all slack filled cans while permitting all properly filled cans to pass, and foam breaking means disposed between the detecting means and the ejecting means in position for breaking any foam bridging clinging to probe pairs so as to assure against false controlling of the ejecting means.

2. Apparatus as defined in claim 1 wherein the spaced pairs of probes are carried by a rotor and the foam breaking means includes a rotor having members projecting therefrom and movable in a path for passing between the probes of the pairs, there being included means for rotating the member carrying rotor in timed relation to the probe carrying rotor so that a member of the member carrying rotor will pass between the probes of each pair of probes as they emerge from a projection into a passing can.

3. In apparatus of the character described, means for feeding filled cans in processional order, slack filled can ejecting means, slack filled can detecting means including spaced probe pairs projectable down into passing cans for contacting the fill therein, control circuit means connecting the probes and the ejecting means for controlling operation of the ejecting means to eject all slack filled cans while permitting all properly filled cans to pass, and means disposed to pass between the probes of the probe pairs as they emerge from the cans for breaking any foam bridging clinging to the probe pairs and assuring against false controlling of the ejecting means.

4. In apparatus of the character described, means for feeding filled cans in processional order with the open tops thereof travelling along a common level, slack fill testing means including a rotor having a plurality of radial slideways spaced equidistantly thereabout, a slide slidable in each slideway and having a tester probe projecting therefrom, means for driving the can feeding means and the rotor in timed relation to cause the tester probes to enter the successively presented cans, and cam means for moving the slides radially to cause the tester probes to be immersed in the fill in adequately filled cans.

5. Apparatus as defined in claim 4 wherein the cam means comprises a grooved stationary cam and each slide has a follower roller engaged in the cam groove.

6. Apparatus as defined in claim 4 wherein the cam means comprises a grooved stationary cam and each slide has a follower roller engaged in the cam groove, said cam groove including a dwell portion effective to control the positioning of the probe means so that the testing end extremities thereof will be held at a predetermined immersion depth in the can fill over a considerable period of time while each can under test is moving along opposite the rotor during a testing interval.

7. Apparatus as defined in claim 4 wherein the cam means comprises a grooved stationary cam and each slide has a follower roller engaged in the cam groove, said cam groove including a dwell portion effective to control the positioning of the probe means so that the testing end extremities thereof will be held at a predetermined immersion depth in the can fill over a considerable period of time while each can under test is moving along opposite the rotor during a testing interval, said cam groove including an upwardly arced dwell portion effective to cause the probe means end extremities to follow an approximately horizontal line at a predetermined depth in the cans as they pass along opposite the rotor during a testing interval.

8. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill.

9. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill and then again return said pin and slide to their retracted positions.

10. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill, there being included also spring means common to all of the radially projectable ejector slides and constantly tending to hold them retracted.

11. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill, there being included also spring means common to all of the radially projectable ejector slides and constantly tending to hold them retracted, and said slide projecting cam also including a portion effective to control the retraction of the slides by said spring means.

12. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill, there being included also a safety plate means having a surface facing inwardly toward and concentric to the ejector rotor center and which opposes pins which have not been projected in a manner for preventing inadvertent radial outward movement of the slides on which they are mounted.

13. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill, there being included also a safety plate means having a surface facing inwardly toward and concentric to the ejector rotor center and which opposes pins which have not been projected in a manner for preventing inadvertent radial outward movement of the slides on which they are mounted, and stationary cam means effective during rotation of the ejector rotor to return all projected pins to their retracted position.

14. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill, there being included also a safety plate means having a surface facing inwardly toward and concentric to the ejector rotor center and which opposes pins which have not been projected in a manner for preventing inadvertent radial outward movement of the slides on which they are mounted, and stationary cam means effective during rotation of the ejector rotor to return all projected pins to their retracted position, the safety plate including a clearance through which the pins can move while being returned to their retracted positions, and an underlying cam surface effective to engage and project pins in the event of reverse movement of the ejector rotor, thereby to prevent jamming contact of pins with the safety plate.

15. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and other cam means for engaging each projected pin in a manner for moving it and the slide by which it is carried to cause the slide to engage and eject the can detected as having the slack fill, each said pin being shiftable along an axis paralleling the axis of the ejector rotor and all of said pin axes lying in a circle when the slides carrying the pins are retracted, and there being included means for supporting the pin projecting cam means and which is horizontally and vertically adjustable to permit accurate placement of the pin projecting cam means over the circle of pins.

16. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detectnig means control into position for engaging and projecting a pin into its effective position, and a stationary cam having a generally elliptical groove in which to receive end portions of the pins when they are projected and having its major axis disposed transversely with relation to the can feed line so that each pin engaging therein and the slide by which it is carried will be moved toward the can feed line so that the slide can directly engage and eject from said line a can detected to be slack filled.

17. In apparatus of the character described, means for feeding filled cans in processional order along a feedway, slack filled can detecting means including devices engageable with fill in adequately filled cans and slack filled can ejecting means comprising a rotor rotatable about a vertical axis beside the can feedway and having thereon a plurality of equidistantly spaced radially projectable ejector slides, power driving means for continuously rotating the rotor, and means operable under control of the detecting means for projecting a slide in proper timed relation to the passing of the cans to directly engage and eject from the feedway a can detected as being slack filled at the detecting station, each said ejector slide having a pin thereon projectable and retractable between effective and ineffective positions, and there also being included cam means placeable under slack fill detecting means control into position for engaging and projecting a pin into its effective position, and a stationary cam having a generally elliptical groove in which to receive end portions of the pins when they are projected and having its major axis disposed transversely with relation to the can feed line so that each pin engaging therein and the slide by which it is carried will be moved toward the can feed line so that a slide can directly engage and eject from said line a can detected to be slack filled, each pin having upper and lower detent receiving recesses therein and there being included a spring detent engageable in each lower recess to yieldably hold the respective pin retracted, and in each upper recess to yieldably hold said pin projected.

References Cited in the file of this patent

UNITED STATES PATENTS

| | | |
|---|---|---|
| 2,324,782 | Kronquest | July 20, 1943 |
| 2,393,188 | Reynolds | Jan. 15, 1946 |
| 2,609,926 | Hartig | Sept. 9, 1952 |
| 2,700,465 | Pechy et al. | Jan. 25, 1955 |
| 2,723,748 | Simpson | Nov. 15, 1955 |